(12) United States Patent
Brunnett et al.

(10) Patent No.: US 12,495,197 B1
(45) Date of Patent: Dec. 9, 2025

(54) ROBUST MOUNTING FOR FOLDED OPTICS ASSEMBLY

(71) Applicant: Apple Inc., Cupertino, CA (US)

(72) Inventors: Justin C Brunnett, San Ramon, CA (US); Nicholas D Smyth, San Jose, CA (US); Hiran R Rathnasinghe, Lemon Grove, CA (US); Reynaldo Vincent H Sta Agueda, Singapore (SG); Wai Shing Sin, Singapore (SG); Julien C Vittu, Saratoga, CA (US)

(73) Assignee: Apple, Inc., Cupertino, CA (US)

( * ) Notice: Subject to any disclaimer, the term of this patent is extended or adjusted under 35 U.S.C. 154(b) by 199 days.

(21) Appl. No.: 18/456,154

(22) Filed: Aug. 25, 2023

(51) Int. Cl.
  *H04N 23/55* (2023.01)
(52) U.S. Cl.
  CPC .................................. *H04N 23/55* (2023.01)
(58) Field of Classification Search
  CPC .. G02B 13/0065; G02B 13/001; G03B 17/17; H04N 23/55
  See application file for complete search history.

(56) References Cited

U.S. PATENT DOCUMENTS

| | | | |
|---|---|---|---|
| 9,557,627 B2 | 1/2017 | Mercado | |
| 11,611,706 B2 | 3/2023 | Shabtay et al. | |
| 11,635,597 B2 | 4/2023 | Yao et al. | |
| 2021/0382269 A1 | 12/2021 | Saiga | |
| 2022/0091398 A1* | 3/2022 | Smyth | H04N 23/687 |

* cited by examiner

*Primary Examiner* — Justin W Rider
(74) *Attorney, Agent, or Firm* — Robert C. Kowert; Kowert, Hood, Munyon, Rankin & Goetzel, P.C.

(57) ABSTRACT

A camera includes a base housing an image sensor. The base is adhered to an optics holder that holds optical components of the camera. The optics holder is located in a recess of the base component and includes a horizontal flange extending outward from an upper portion of vertical perimeter walls of the optical components holder. The horizontal flange redirects adhesive horizontally during assembly (may include an active alignment process) of the camera, and the horizontal adhesive adheres the flange to an upper horizontal ledge of the base. An exposed portion of the adhesive between the horizontal flange and the upper horizontal ledge of the base may be cured via ultraviolet light to prevent shifting of the optics holder during transport of the camera to a thermal curing process. A lower portion of a vertical interior wall of the base may include another ledge that redirects adhesive during assembly.

20 Claims, 7 Drawing Sheets

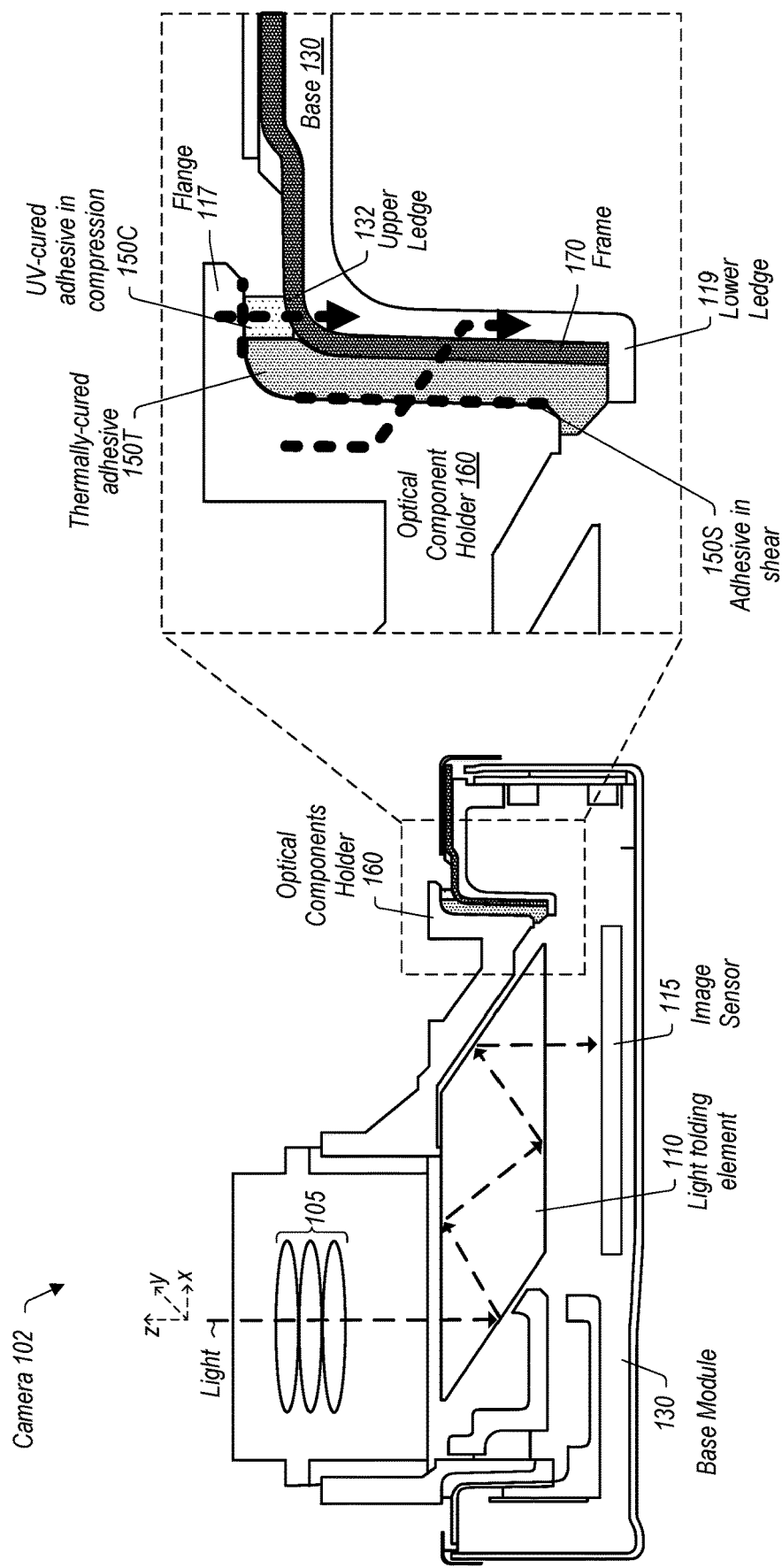

ROBUST MOUNTING FOR FOLDED OPTICS ASSEMBLY

BACKGROUND

Technical Field

This disclosure relates generally to a camera and more specifically to structures designed for holding optical components of a camera.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may include complicated optical components to provide desired image capturing functions and qualities. However, the optical components may add undesirable dimension of a camera, e.g., a thickness along an axis. It is desirable to minimize the dimensions of the optical components of the camera.

Furthermore, alignment of components of the camera may be disturbed during camera assembly. It is desirable to steady aligned features of the camera during assembly.

In addition, an assembled camera including the optical components may be subject to unwanted motion, e.g., an accidental drop from the hands of a user. During such events, the optical components may experience sudden movement with a large acceleration, which could cause damages to the optical components especially when they have a large mass. Thus, it is desirable to have structure(s) designed for holding the optical components of a camera to address these issues. Features of some such structures may be considered with regard to the robustness and functionality of the device, as well as with regard to the manufacturing and assembly of such devices.

BRIEF DESCRIPTION OF THE DRAWINGS

FIGS. 1A-1B show an example camera with base and optics holder components including flange and ledge-based features for robust mounting for a folded optics assembly, according to some embodiments.

Figure 2B:
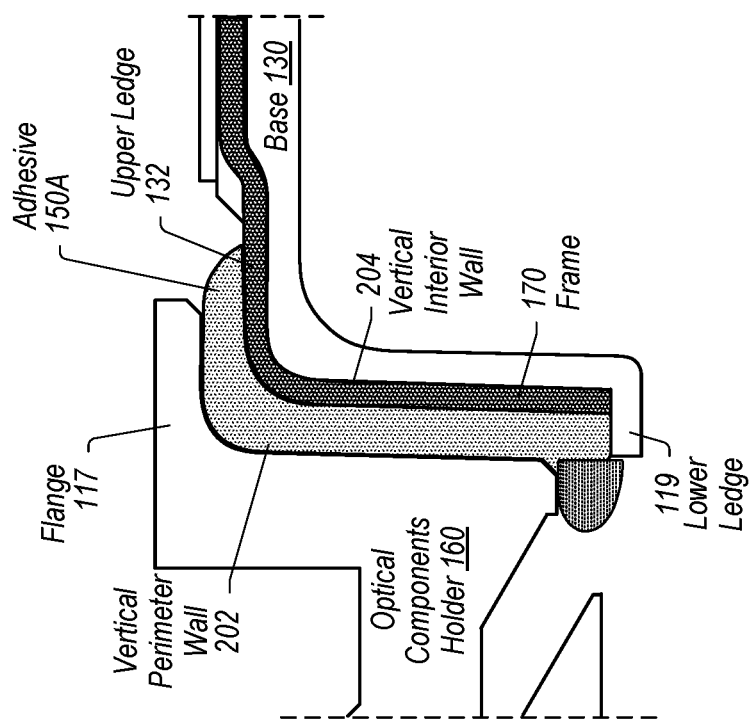
FIGS. 2A-2B show examples of adhesive formations between base and optics holder components of a camera, some of which include flange and ledge-based features for robust mounting for a folded optics assembly, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting." depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to ledge and scoop features for structure(s) of a camera designed for holding optical components of the camera (e.g., for robust mounting for a folded optics assembly). For example, a base structure of a camera may be adhered to an optical component holder of the camera via adhesive. In embodiments, either or both of the base structure and optical component holder may include various combinations of flange and/or ledge features associated with the adhesive. In embodiments, some such features may direct or otherwise control movement of adhesive during assembly of the camera, may act to retain alignment of one or more components of the camera during and/or after assembly, may maintain camera robustness during physical shocks, may locate assembly adhesive in an improved position of compression, and/or may increase surface area available for locating the adhesive up to and including a continuous bond line between components that are adhered together, as non-exhaustive examples.

In at least some embodiments herein, a flange feature at an upper region of the optical components holder (sometimes referred to as a prism holder) extends over the optics mounting surface of the base (sometimes referred to as a voice coil motor (VCM)). The flange may be formed so as to contain the adhesive, and/or to provide additional compressive support, while also meeting design and manufacturing requirements for ultraviolet curing of at least some of the adhesive. A ledge feature (sometimes referred to as a scoop) formed at a lower region of a recess in the base may act to prevent overflow into a sensor and actuator region. In some embodiments, a base of a camera may be formed with filled-in corners (sometimes referred to as closed corners) that may act as additional surface area for adhesive, improving active alignment position retention, and/or preventing particles from entering in to the sensor area of the camera, as non-exhaustive example benefits.

For example, adhesive may be used at an interface (e.g., walls, surfaces, or the like) between a base component and an optics holder component. The interface of either or both components may be formed with (or otherwise include) ledge and/or flange features. For example, in the case where the camera is assembled by lowering the optics holder component down into a recess in the component's surrounding base component, an outward-facing ledge or flange may be formed (or otherwise located) towards the top of an outer wall of the optics holder. The outward-facing flange may be located on the optics holder component such that adhesive that is squeezed out of the interface during assembly of the camera is directed by the flange in a horizontal direction (e.g., in a direction substantially perpendicular to an interface wall between the components). By directing the adhesive to move in a substantially-horizontal direction (as compared to moving substantially in a direction parallel to a z-axis or parallel to an optical axis, in various embodiments) an overall height of the camera assembly may be reduced and/or the optics holder component may be held more tightly by horizontal adhesive between the ledge and the corresponding surface of the base (a compressive force, instead of a shearing support exhibited by vertical adhesive).

In another example, an inward-facing ledge feature may be formed (or otherwise incorporated) into a lower part of the interface wall of the base such that adhesive that is squeezed out of the interface during assembly of the camera is directed by the ledge (sometimes referred to as a scoop) in a substantially-horizontal direction (e.g., in a direction substantially perpendicular to an interface wall between the components. Again, by directing the adhesive to move in a substantially-horizontal direction an overall height of the assembled components may be reduced, and/or the optics holder component may be held more tightly by horizontal adhesive between the scoop and the corresponding surface of the optics holder component (a compressive force, instead of a shearing support).

In embodiments, adhesive (sometimes referred to as glue) in compression with a high modulus (e.g., a high modules achieved via UV penetration) helps to hold the optical components holder in place after an active alignment (AA) process is completed. Once the alignment is complete, the UV light locks the optical components holder in place so that optics do not shift when the module is transferred to an oven for full thermal cure of the adhesive. In embodiments, if there is not adhesive in compression with good UV cure, then the optics can shift during transfer to the oven.

In embodiments, adhesive in compression with a high modulus between two components such as the flange and the upper ledge of the base (or between a lower ledge and a lower surface of the optical components holder) prevents creepage/relaxation of the adhesive over time. In embodiments, adhesive in compression with a high modulus between two components such as the flange and the upper ledge of the base maintains the optical alignment from active alignment over the lifespan of the product.

In embodiments, adhesive in compression with a high modulus between two components such as the flange and the upper ledge of the base (or between a lower ledge and a lower surface of the optical components holder) helps to support the high mass of the optics during shock condition.

Glue in compression can be more rigid that glue in shear, which reduces the displacement of the optics mass in shock, in embodiments.

In embodiments, adhesive in compression with a high modulus between two components such as the flange and the upper ledge of the base (or between a lower ledge and a lower surface of the optical components holder) is less susceptible to failure in shock. In embodiments, adhesive in shear is more likely to experience an adhesive failure from glue to optical components holder or glue to base which will degrade the optics alignment to the sensor. Glue in compression is more robust and can withstand higher shock loads before failure, in embodiments.

In embodiments, a flange overhang region provides a beneficial place for moving adhesive in the shear process (the vertical wall) to overflow. Not only does the flange prevent the adhesive from squeezing up in Z too far (adding to product height), the adhesive that is squeezed horizontally to the side as redirected by the flange is used as compressive adhesive, in embodiments. Such structures (flanges/ledges that direct adhesive, closed corners) may act as a particle seal to prevent ingress to a sensor package region. In embodiments, adhesive all around the perimeter of the optical components module (including corners) increases reliability robustness in shock situations (e.g., when the camera is dropped, vibrated, or otherwise disturbed). In some embodiments, adhesive substantially-continuously or continuously all around the perimeter improves active alignment position retention performance by providing uniform curing, and reduces out of balance forces that lead to optics tilt (e.g., non-uniform adhesive may shrink, causing uneven forces).

Additionally, in some embodiments, by directing the adhesive to move or flow in a horizontal direction during assembly, interference between the adhesive and various components of the camera may be avoided (e.g., adhesive may be prevented from traveling to unwanted spaces/areas) either during assembly, or later during operation of the camera, for example.

In embodiments, various combinations of the ledge and/or flange feature may be located at various locations along the interface between two components. For example, one or both of the ledge and flange features may be located substantially continuously along the interface (a circumference) between the two components. In another example, the flange feature may be located substantially continuously along the interface while the ledge feature is located at one or more locations that are less than substantially-continuous along the interface (e.g., along opposite sides, but not on the ends) or vice versa. Other combinations are contemplated, as illustrated in the FIGS, described below.

In some embodiments, the camera may include one or more lenses and a light folding element, collectively referred to as optical components. The one or more lenses may receive light from an external environment of the camera. The light folding element may fold the light that passes through the lenses, e.g., to change or re-direct a transmission path of the light, to an image sensor of the camera. The image sensor may in turn generate image signals, e.g., electrical signals, which may be further processed by a processor to render an image. In some embodiments, the light folding element may be a parallelogram prism. Alternatively, in some embodiments, the light folding element may have a different geometry shape, e.g., a triangle prism, even a reflective mirror, etc. In some embodiments, the camera may be integrated as part of a mobile multipurpose device such as a smartphone, a tablet, a pad device, and the like.

In some embodiments, the camera may include one or more structures (including various ledge and/or flange features) to hold the foregoing optical components. In some embodiments, the one or more structures may be one single piece of structure to hold the lenses and the light folding element. Alternatively, in some embodiments, the one or more structures may include multiple separate pieces, e.g., a first piece to hold the lenses and a second piece to hold the light folding element. For purposes of illustration, in this disclosure the one or more structures will be described as including two pieces joined together as an example. Either case, the one or more structure(s) for holding the optical components may be referred to as optical components holder in this disclosure.

As non-exhaustive examples, various of the camera components (e.g., the optical component holder, the base) may be made from one or more of various materials such as metal, plastic, glass, ceramic, etc. Various different adhesive may be used to bond the components. For example, exposed portions of a frame (e.g., metal, plastic, etc., or combinations thereof) may be used as a bonding surface to bond the optical components holder with another component of the camera, e.g., another stationary component of the camera (e.g., a base component or other component) to fix at least the portion of the holder that holds the light folding element. In some embodiments, the corresponding bonding surface of the other component of the camera may be of the same or different one of various materials such as metal, plastic, glass, ceramic, etc. Adhesives may include metal-to-metal adhesive, metal-to-plastic adhesive, plastic to plastic adhesive, plastic-to-glass adhesives, metal-to-glass adhesive, etc., without limitation.

In some embodiments, the camera may include an auto-focus (AF) function whereby the object focal distance between the optical components and the image sensor may be adjusted, e.g., along an optical axis of the optical components. In addition, in some embodiments, the camera may include an optical image stabilization (OIS) function that may sense and react to external excitation or disturbance by adjusting the relative position between the image sensor and the optical components, e.g., in one or more directions orthogonal to the optical axis. In some embodiments, the AF and/or OIS functions may be implemented using a sensor-shift design, using which the image sensor may be movable relative to the optical components in the foregoing directions. In some embodiments, the sensor-shift design may include a "floating" image sensor mounting structure that may suspend the image sensor from another stationary component of the camera, thus providing degrees of motion freedom for the image sensor. In addition, the motion of the image sensor may be controlled using one or more actuators, e.g., one or more voice coil motor (VCM) actuators.

FIGS. 1A-1B show an example camera with base and optical components holder components featuring flange and ledge-based features, according to some embodiments. For purposes of illustration, a coordinate system defined by X-Y-Z axes is also displayed in FIG. 1, where an optical axis of the optical components is defined as the Z-axis. In some embodiments, the optical axis (or Z-axis) may correspond to the transmission path of a principal light ray passing through one or more lenses 105 of the camera. In some embodiments, the transmission path of the principal light ray within the camera may not necessary be a straight but rather a folded line, e.g., folded by a light folding element of the camera. In that case, the optical axis (or Z-axis) may refer to a straight portion of the folded transmission path. Further, for purposes of illustration, only relevant components of the camera are shown in the figures.

As indicated in FIG. 1A, camera 102 may include one or more lenses 105, light folding element 110, and image sensor 115. In this disclosure, the lenses 105 and light folding element 110 may be collectively referred to as optical components. In this example, light folding element 110 may be placed optically between lenses 105 and image sensor 115, such that light folding element 110 may fold light that passes through lenses 105, e.g., change or redirect the transmission direction of the light (illustrated with arrows in FIG. 1A) to image sensor 115. Alternatively, in some embodiments, light folding element 110 may be placed optically in front of lenses 105 along the transmission path, such that light from external environment into camera 102 may be first folded by light folding element 110, and then pass through lenses 105 to image sensor 115. As indicated in FIG. 1A, light folding element 110 may be a parallelogram prism. Alternatively, light folding element 110 may have a different geometry shape, such as a triangle prism, a reflective mirror, etc., to provide the designed light folding function. In some embodiments, camera 102 may further include infrared cutoff filter, which may be placed optically in front of image sensor 115 to block infrared light from reaching image sensor 115.

In some embodiments, camera 102 may include optical components holder 160 for holding the optical components, e.g., lenses 105 and light folding element 110. In embodiments, optical components holder 160 may include two separate pieces joined or attached together. The first piece may be used to contain lenses 105, whilst the second piece may be used to hold light folding element 110. Alternatively in some embodiments, optical components holder 160 may be a component of one single integral piece. In some embodiments, optical components holder 160 may be affixed with, directly or indirectly, another component of camera 102, such as stationary structure 130 (sometimes referred to as a base) of camera 102. As a result, optical components holder 160 and the optical components (e.g., lenses 105 and light folding element 110) within optical components holder 160 may stay fixed, or at least not supposed to move, during normal operations of camera 102. Note that during unwanted moving events, optical components holder 160 and the optical components may still move unexpectedly.

In some embodiments, camera 102 may include AF and/or OIS functions. To implement the AF and/or OIS functions, camera 102 may include a sensor-shift design with which image sensor 115 may be movable relative to the optical components of camera 102. For instance, as indicated in FIG. 1A, image sensor 115 (and infrared cutoff filter 120) may be mounted on to a substrate. In some embodiments, the substrate may include one or more printed circuit boards (PCBs). In some embodiments, the substrate may be suspended from stationary structure 130 via a suspension structure. As a result, the substrate (and image sensor 115) may be "floated" relative to stationary structure 130, but also movable relative to stationary structure 130 (and the optical components such as lenses 105 and light folding element 110) approximately along the X- and/or Y-axis. Further, camera 102 may include at least one actuator and one or more coils. Camera 102 may conduct regulatable current through coils the coils, which may interact with the one or more magnetic fields of magnets to generate motive force (e.g., Lorentz force) to control the movement of image sensor 115. The movement of image sensor 115 relative to the optical components (e.g., lenses 105 and light folding element 110) in the X- and/or Y-axis may be used to implement an OIS function. In some embodiments, camera 102 may include one or more additional suspension structures and/or one or more additional actuators (not shown) that may allow image sensor 115 to move relative to the optical components approximately along the Z-axis to perform an AF function.

Figure 2A:
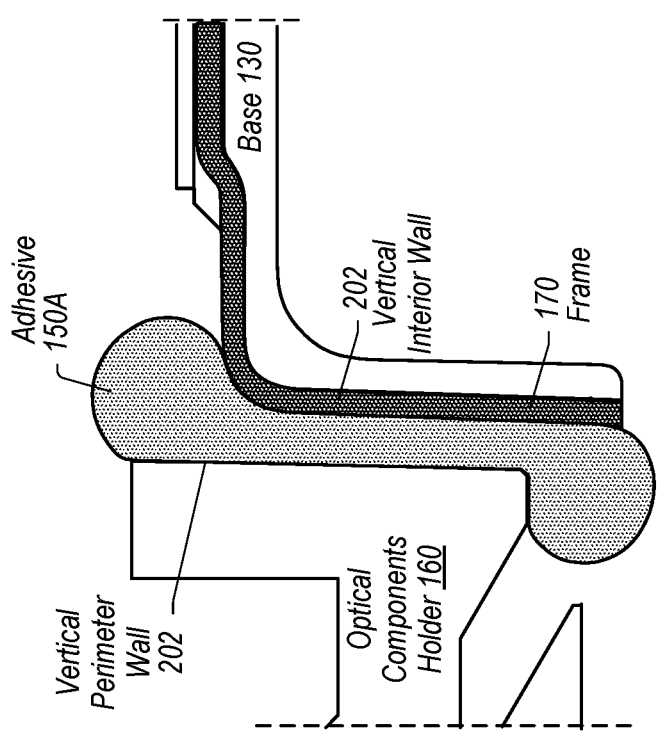

FIGS. 2A-2B show an example of adhesive formations between base and optics holder components of a camera, some of which include flange and ledge-based features, according to some embodiments. FIG. 2A illustrates adhesive 150A between optical components holder 160 and base component 130. In the illustrated embodiment a bulb of adhesive 150A extends above the illustrated portion of optical components holder 160 and below the illustrated portion of base 130. In some examples, the bulb of adhesive that extends vertically in the Z-direction above and below the illustrated portion of the assembly may be formed during assembly of the optical components holder 160 to the base 130. In the illustrated embodiment, vertical perimeter wall 202 of the optical components holder 160 is adhered to vertical interior wall 204 of the base 130. In the illustrated embodiment the base 130 includes a frame 170 (e.g., metal, or other material), portions of which may be adhered to the optical components holder 160.

FIG. 2B illustrates adhesive 150A between optical components holder 160 and base component 130. In the illustrated embodiment adhesive 150A does not extend above the illustrated portion of optical components holder 160 and does not extend below the illustrated portion of base 130. In the illustrated embodiment, flange 117 and lower ledge 119 have redirected the adhesive horizontally (during assembly). In some examples, the adhesive that has been redirected horizontally in the X-direction (and Y-direction, in embodiments) may be formed during assembly of the optical components holder 160 to the base 130. In the illustrated embodiment, horizontal portions of adhesive 150A adhere flange 117 to an upper ledge 132 of the base component 130, and lower ledge 119 has redirected a lower portion of the adhesive 150A between the lower ledge 119 and horizontal surfaces of a lower portion of optical components holder 160. In the illustrated embodiment the base 130 includes a frame (e.g., metal, or other material), illustrated portions of which may be adhered to horizontal surfaces of the optical components holder 160 by horizontally-oriented adhesive.

In embodiments, the base module 130 includes a lower horizontal ledge 119 that extends inward, from the one or more vertical interior walls 204 of the recess, at least to a lower end portion of the one or more vertical perimeter walls 202 of the optical components holder 160. In embodiments, adhesive extends between the lower horizontal ledge 119 that extends inward from the one or more vertical interior walls 204 of the recess and one or more surfaces of the optical components holder 160 at the lower end portion of the one or more vertical perimeter walls 202. In embodiments, the lower horizontal ledge 119 that extends inward from the one or more vertical interior walls is formed to redirect a flow of the adhesive 150A horizontally, during assembly of the optical component holder 160 into the recess of the base module 130, so that the adhesive 150A does not protrude below the lower horizontal ledge 119.

Figure 3A:
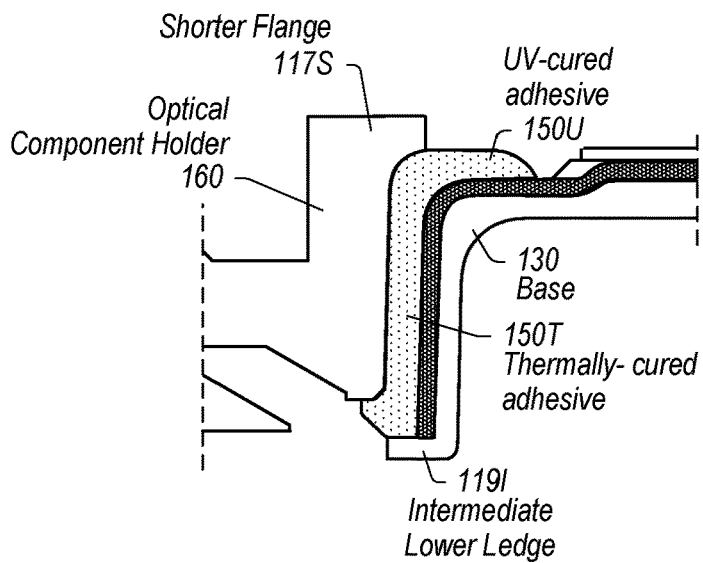
FIGS. 3A, 3B and 3C show variations of flange, ledge, and adhesive features of base and optics holder components for robust mounting for a folded optics assembly of a camera, according to some embodiments.
Figure 3B:
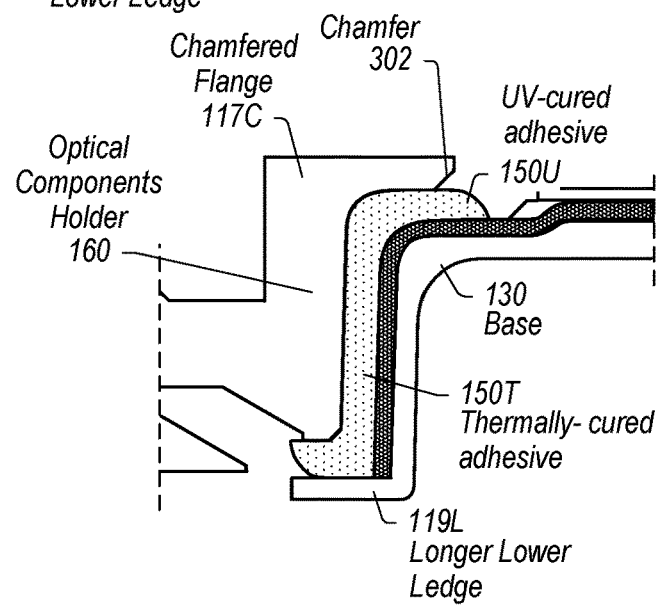
Figure 3C:
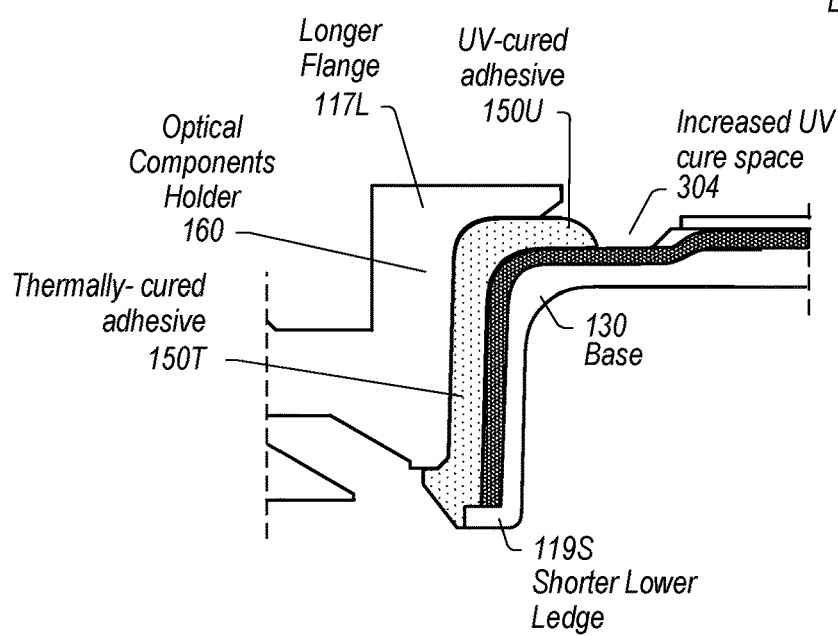

FIGS. 3A, 3B and 3C show variations of flange, ledge, and adhesive features of base and optics holder components of a camera, according to some embodiments. FIGS. 3A-3C illustrate that flange 117 of optical components holder 160, and lower ledge 119 of base component 130 may be over varying lengths. FIG. 3A illustrates thermally-cured adhesive 150T sandwiched between an intermediate length lower ledge 119I and a lower horizontal surface of optical components holder 160. In the illustrated embodiment that intermediate length lower ledge 119I is illustrated as ending horizontally below the thermally-cured adhesive 150T and not extending horizontally to underneath the optical components holder 160. In the illustrated embodiment, the intermediate lower ledge 119I and the shorter flange 117S may each extend horizontally such that those feature overlap. In the illustrated embodiment shorter flange 117S extends horizontally to a point ending at about the face of the frame of the base component 130. FIG. 3A illustrates UV-cured adhesive exposed between the end of the flange 117S and upper horizontal components of the base 130. Shorter flange 117S may be chamfered (not illustrated), to increase exposure of the adhesive 150A to an ultraviolet light curing process, in embodiments.

FIG. 3B illustrates chamfered flange 117C with chamfer 302 that increases exposure of the adhesive 150A to an ultraviolet curing process, resulting in UV-cured adhesive 150U. FIG. 3B illustrates a longer lower ledge 119L that extends horizontally beyond a face of the optical components holder 160 to a point underneath a lower horizontal surface of the optical components holder 160. The flange 117 may be formed to redirect a flow of the adhesive 150A horizontally, during assembly of the optical component holder into the recess of the base module, so that the adhesive does not protrude above the horizontal flange.

FIG. 3C illustrates base component 130 with a shorter lower ledge 119S that does not extend horizontally past the thermally-cured adhesive 150T. FIG. 3C illustrates an increased UV cure space 304 between a chamfer of longer flange 117L and upper horizontal surface of the base component 130. In embodiments, a chamfer may increase the space 304 such that adhesive 150A is exposed to additional UV light. In embodiments, features of an upper horizontal surface may be moved away from the space 304 to increase the space for the UV light (e.g., to make room for the UV light, despite configurations with a longer flange 117L.

In embodiments, the increased UV cure space 304 (sometimes referred to as an opening) between the horizontal flange 117 of the optical components holder 160 and the upper horizontal ledge 132 of the base module 130 is configured to allow ultraviolet light to reach the adhesive extending between the horizontal flange 117 of the optical components holder 160 and the upper horizontal ledge of the base module 130.

Figure 4A:
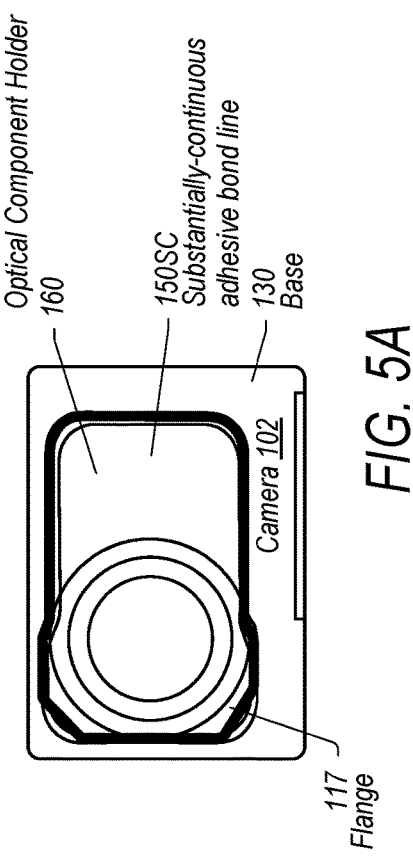
FIGS. 4A-4B show another example camera where an optics holder component, without a flange, is assembled together with a base component with open corners, for robust mounting for a folded optics assembly, according to some embodiments.
Figure 4B:
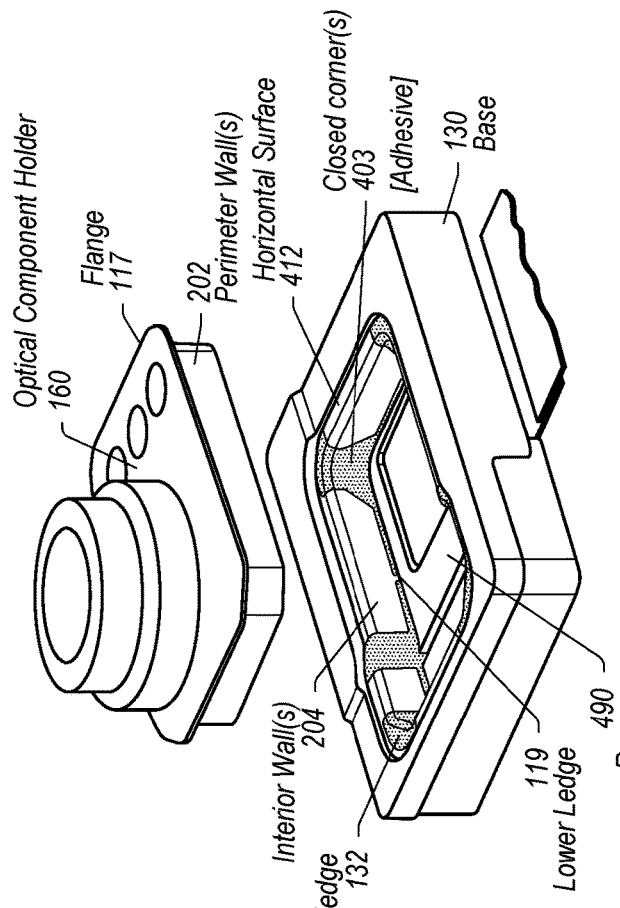

FIGS. 4A-4B show another example camera where an optics holder component, without a flange, is assembled together with a base component with open corners, according to some embodiments. FIG. 4A illustrates camera 102 with discontinuous adhesive 150D1 along a horizontal seam between optical components holder 160 and base component 130 and vertical discontinuous adhesive 150D2 along a vertical seam between optical components holder 160 and base component 130. Camera 102 lacks adhesive entirely on a seam on the left-hand side of camera 102, in the illustrated embodiment.

FIG. 4B illustrates base 130 of camera 102 with a recess 490 into which the optical components holder 160 is placed. In the illustrated embodiment interior walls 204 of the recess have open corners 402. In the illustrated example, there is no place for adhesive at one or more of the open corners 402 between the optical components holder 160 and the base component 130 at the corners of the recess, because there are not two surfaces close enough together to be adhered by adhesive in the open corners 402. In the illustrated embodiment, only portions of the perimeter walls 202 of the optical components holder 160 correspond to, and will be adhered to, corresponding portions of the interior walls 204 of the base component 130. FIG. 4B illustrates an optical components holder 160 without a flange 117, and without a lower ledge 119.

Figure 5A:
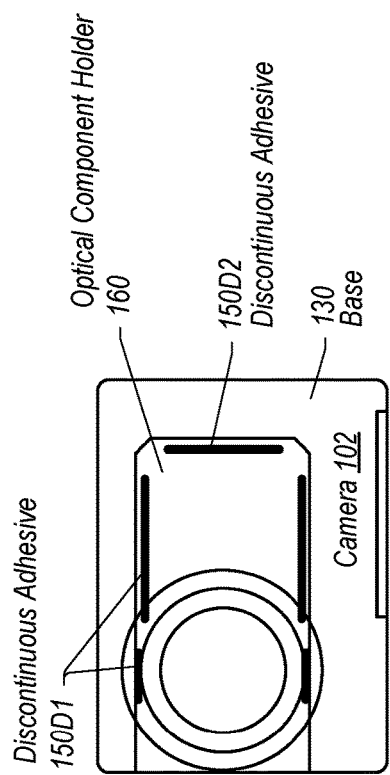
FIGS. 5A-5B show another example camera where an optics holder component, with a flange, is assembled together with a base component with closed corners, for robust mounting for a folded optics assembly, according to some embodiments.
Figure 5B:
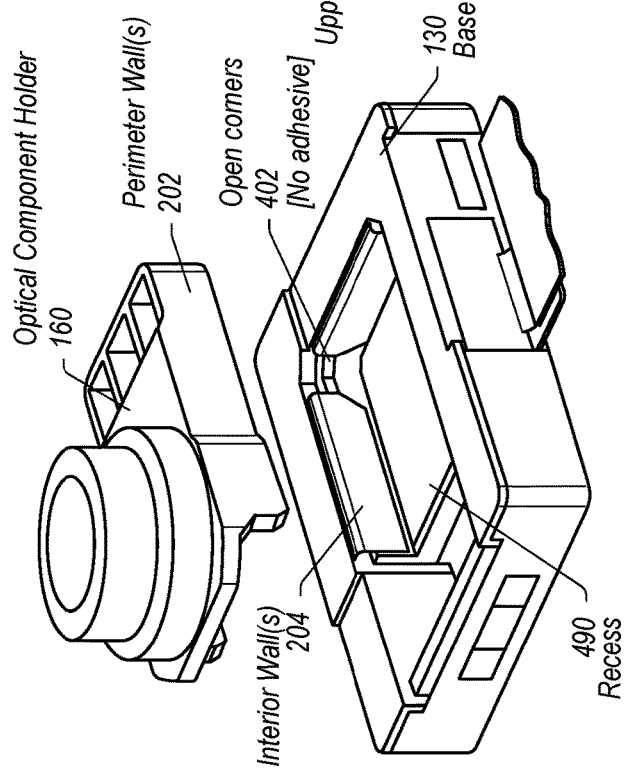

FIGS. 5A-5B show another example camera where an optics holder component, with a flange, is assembled together with a base component with closed corners, according to some embodiments. FIG. 5A illustrates camera 102 with a substantially continuous adhesive bond line 150SC between flange 117 of optical component holder 160 and base component 130. In embodiments, flange 117 may not be entirely continuous around a perimeter of optical component holder 160 (e.g., for ease of manufacturing, or for design considerations such as space considerations, or otherwise). In some embodiments, the substantially-continuous bond-line may be formed wherever the flange provides a surface for forming a bond to a horizontal surface of the base.

FIG. 5B illustrates base 130 with recess 490, lower ledge 119, upper ledge 132, interior walls 204, horizontal surface 412, and closed corners 403. The closed corners 403 may be formed of plastic or other material, and may provide a surface for additional or continuous adhesive between the optical component holder 160 and the base 130 (when compared to the camera 102 in FIGS. 4A, 4B, for example). It is contemplated that other portions of the walls of the recess 490 may be filled in with plastic or other material to form such surfaces for additional adhesive bonding to the perimeter walls 202 of the optical components holder 160.

FIG. 5B is illustrated with lower ledge 119 along a lower portion of interior walls 204 of the base component. In embodiments, the lower ledge 119 may be continuous or substantially continuous around a perimeter of the recess (e.g., the lower ledge may be missing from some small sections of the base due to various manufacturing or design considerations or the like). In embodiments, portions of the lower ledge 119 may be formed along the horizontal interior walls, in the closed corners 403, or various combinations thereof. FIG. 5B illustrates upper ledge 132 along an upper portion of the recess 490 of the base component 130. In embodiments, portions of the upper ledge 132 may be formed along the horizontal interior walls, in the closed corners 403, or various combinations thereof. FIG. 5B illustrates horizontal surface 412 along an upper portion of the recess 490 of the base component 130. In embodiments, portions of the horizontal surface 412 may be formed near the upper portion of the horizontal interior walls, in the closed corners 403, or various combinations thereof.

It is contemplated that for some embodiments, a substantially continuous bond-line of adhesive may be formed partially along horizontal surfaces between the flange 117 and corresponding horizontal surfaces of the base as well as partially along vertical surfaces of the interior walls 204 of the recess 490 of the base 130 and the perimeter walls 202 of the optical components holder 160 (e.g., where a flange portion may be missing along a portion of the perimeter), and various combinations thereof. Such a continuous bond line may have the benefit of excluding small particles or liquids from entering the recess via space between the optical components holder 160 and the base 130, for example.

In some embodiments, a camera 102 may include a base module 130 and an optical components holder 160. The base module 130 may include an upper horizontal ledge 132, a recess 490 that includes vertical interior walls 204 extending down from the upper horizontal ledge 132, and an image sensor located at a bottom area of the recess 490. The optical components holder 160 may include vertical perimeter walls 202 extending into the recess and facing the one or more vertical interior walls 204 of the recess 490. The optical components holder 160 may include a horizontal flange 117 extending outward from the one or more vertical perimeter walls 202 and at least partially over the upper horizontal ledge 132 of the base module 130. In embodiments, an adhesive may be used to adhere the optical components holder 160 to the base module 130. The adhesive may extend between the vertical perimeter walls 202 of the optical components holder and the vertical interior walls 204 of the recess 490, and between the horizontal flange 117 of the optical components holder 160 and the upper horizontal ledge 132 of the base module 130.

In embodiments, the one or more vertical interior walls 204 of the base module provide a continuous vertical boundary for the recess, and the adhesive 150 extends continuously between the vertical surfaces around the boundary.

In embodiments, the upper horizontal ledge 132 of the base module 130 (including corresponding portions of closed corners 403) and the one or more vertical interior walls 204 of the base module (including corresponding portions of closed corners 403) provide a continuous surface at an upper perimeter of the recess 490.

Figure 6:
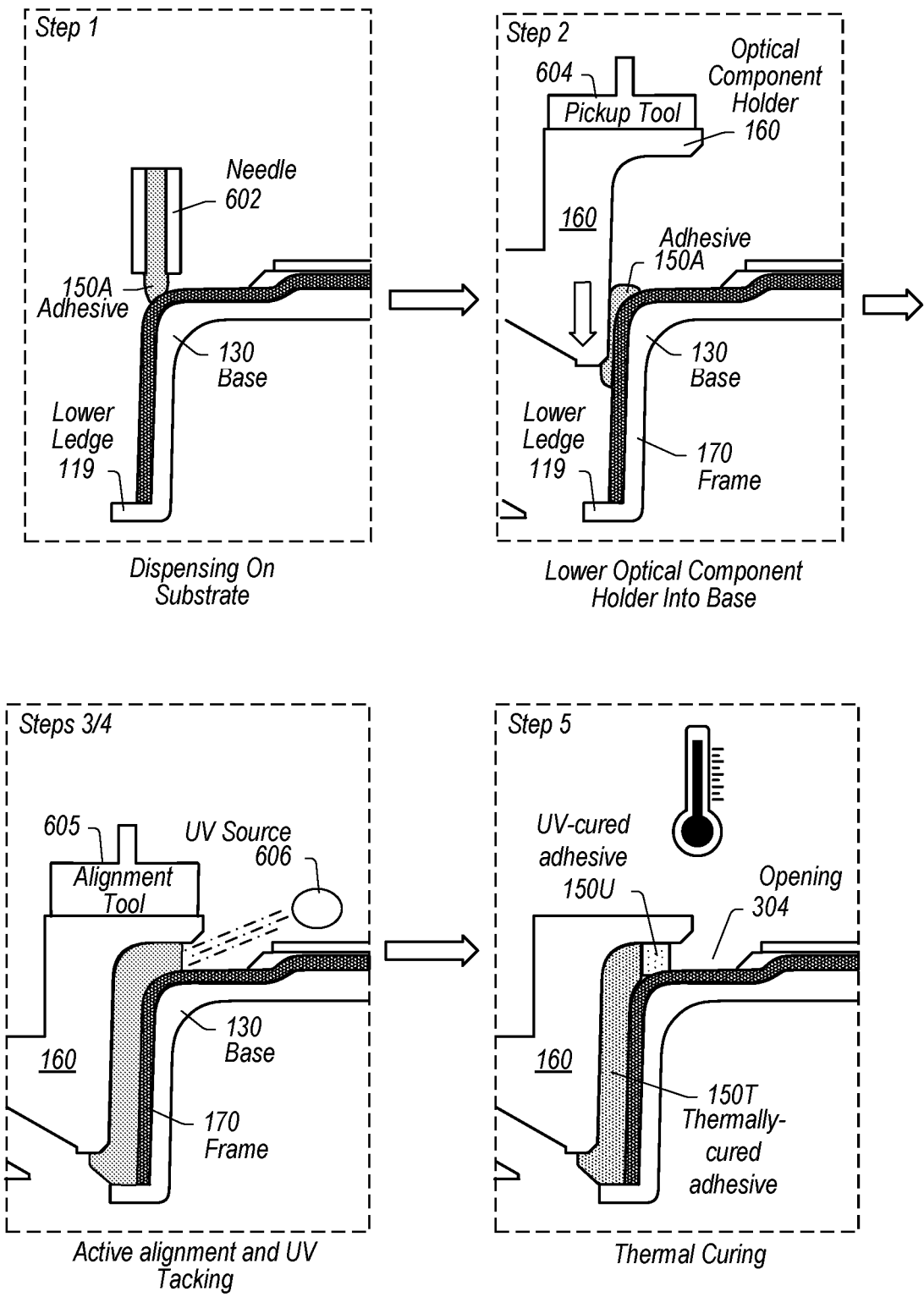
FIG. 6 shows an example camera assembly process, including a UV tacking process, for robust mounting for a folded optics assembly, according to some embodiments.

FIG. 6 shows an example camera assembly process, including a UV tacking process, according to some embodiments. In some embodiments, the process illustrated in FIG. 6 includes an active alignment step as well as a subsequent ultraviolet (UV) tacking (Step 4 in FIG. 6). Either of these illustrated steps may be eliminated or included, together or separately, in an assembly process, in various embodiments. FIG. 6 is illustrated as attaching an optical components holder 160 to a base assembly 130, in particular.

As illustrated in FIG. 6, at Step 1, adhesive 150A is dispensed on top, along an upper surface of the base 130 by a needle 602 (e.g., using a fully automated dispensing+pick and place machine (not illustrated)). The needle 602 is positioned to dispense the adhesive (e.g., offset to the outside wall surface of the base assembly 130). In embodiments, the adhesive is placed by the needle to overhang off of the base, over the lower ledge 119, such that when the optical components holder 160 is lowered down on to the base 130, the adhesive is sheared along the walls. At Step 2, the optical components holder 160 is picked-up by pickup tool 604 (e.g., from a shipping tray or tape and reel carrier) and placed down into the recess of the base 130. Glue/Adhesive 150A is sheared between the base 130 and the optical components holder 160 during the placement process illustrated in Step 2. Glue coverage is dependent on the volume of adhesive dispensed and wall heights of the components, in embodiments. At Step 3, an active alignment tool 605 actively aligns the optical components holder 160 within the recess of the base component 130.

In some embodiments, optical components (e.g., optical components held in an optical components holder 160) are actively aligned to the image sensor 115 to achieve alignment of the optics to the sensor and maximize optical performance. The active alignment process may include moving the optical components holder and/or optical components within the holder (e.g., in any or all of x,y,z directions) while observing an image produced at the image sensor to achieve a preferred alignment position. Once achieved, the preferred active alignment position can degrade/shift if the optics (or the optical components holder 160) shift, either during the assembly process (e.g., moving station to station before the module is fully cured) or after the assembly process (e.g., after a +/−Z axis drop event where the optics experience high acceleration and the adhesive fails). At least some embodiments herein act to prevent loss of the active alignment position during the assembly process, and during the lifetime of the assembled device.

At Step 4, sheared glue that flows from disturbance by the assembly process and/or active alignment is UV tacked (e.g., in-situ or otherwise, via UV source 606) to ensure the optical components holder 160 will not move during transport (e.g., to a thermal cure oven). Step 5 illustrates that the camera assembly 102 goes to a thermal curing process machine to fully cure the adhesive and ensure the optical component holder 160 and base assembly 130 do not separate or become mis-aligned during reliability test or in the field (e.g., if system is accidentally dropped or otherwise physically shocked by the customer). In embodiments, a shock direction is along +/−Z axis. Other shock directions are contemplated.

In embodiments, cured adhesive between the horizontal flange 117 of the optical components holder 160 and the upper horizontal ledge 132 of the base module 130 is configured to provide a compressive resistance to vertical forces.

Figure 7:
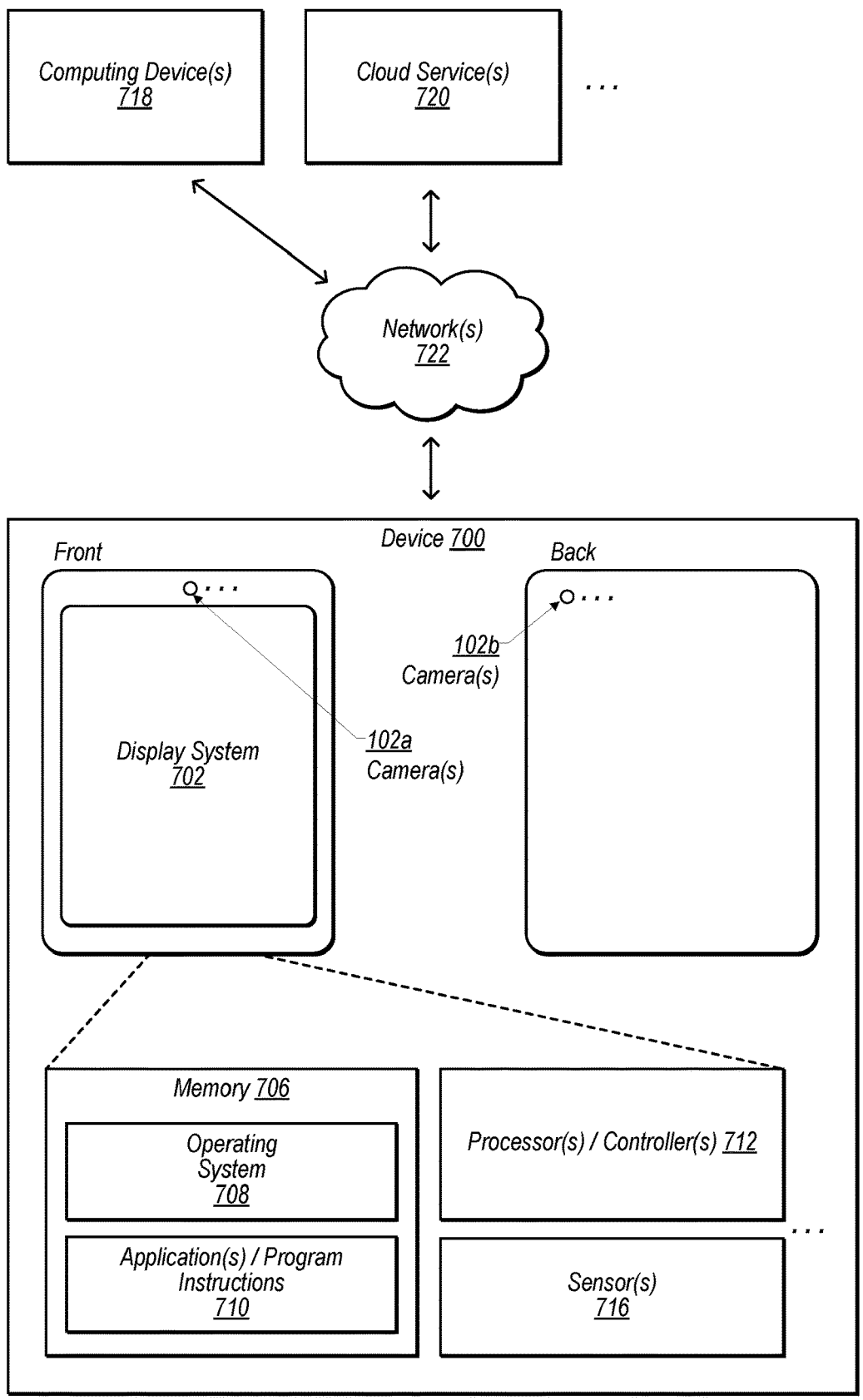
FIG. 7 shows a schematic representation of an example device that may include a camera having an optics holder component with a flange and/or a base component with a ledge feature, for robust mounting for a folded optics assembly, according to some embodiments.

FIG. 7 shows a schematic representation of an example device that may include a camera having an optics holder component with a flange and/or a base component with a ledge feature, (e.g., as described above) according to some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 102. In some non-limiting embodiments, the display system 702 and/or one or more front-facing cameras 102a may be provided at a front side of the device 700, e.g., as indicated in FIG. 7. Additionally, or alternatively, one or more rear-facing cameras 102b may be provided at a rear side of the device 700. In some embodiments comprising multiple cameras 102, some or all of the cameras may be the same as, or similar to, each other. Additionally, or alternatively, some or all of the cameras may be different from each other. In various embodiments, the location(s) and/or arrangement(s) of the camera(s) 102 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller (s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 810) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
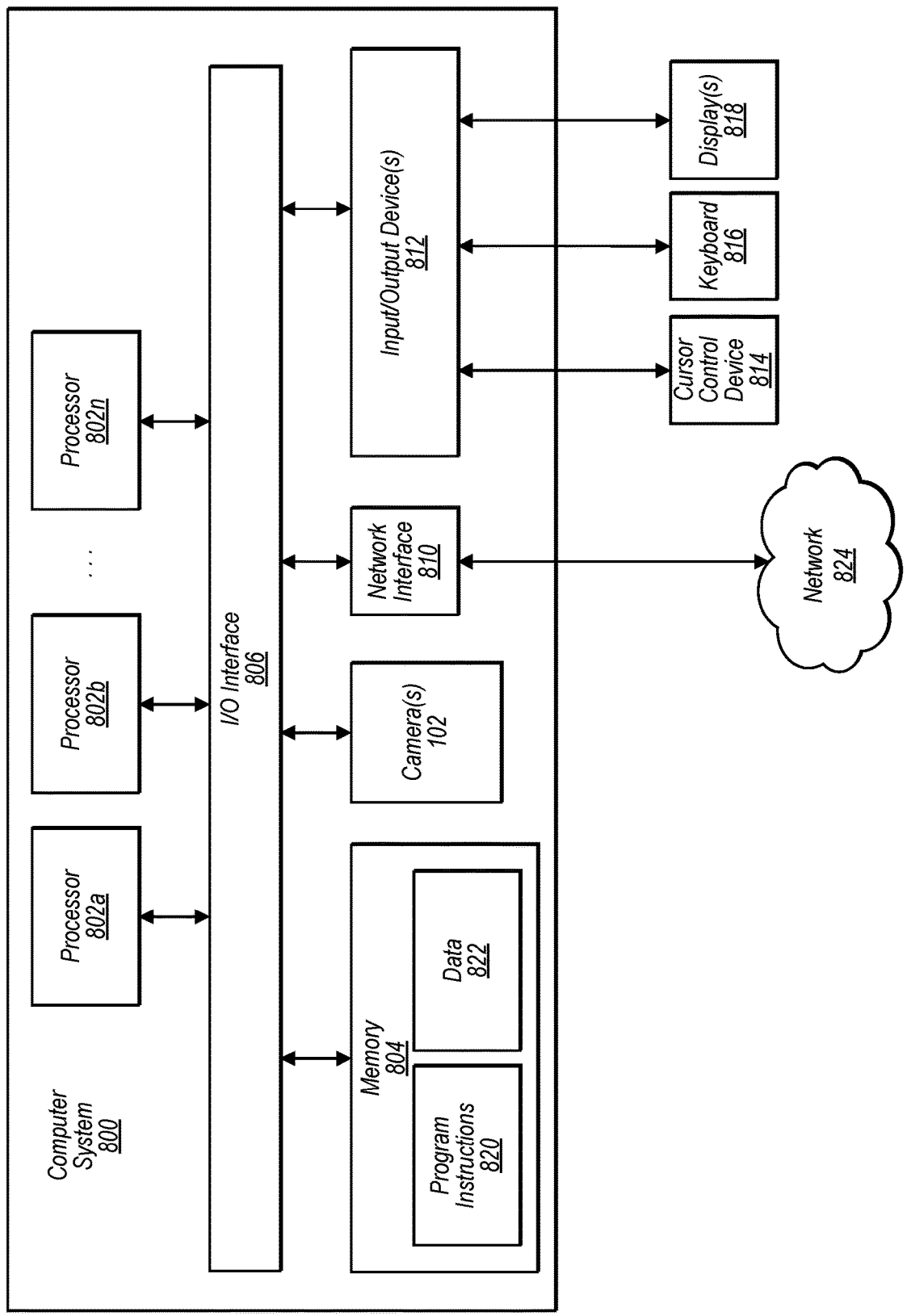
FIG. 8 shows a schematic block diagram of an example computer system that may include a camera having an optics holder component with a flange and/or a base component with a ledge feature, for robust mounting for a folded optics assembly, according to some embodiments.

FIG. 8 shows a schematic block diagram of an example computer system, referred to as computer system 800, that may include or host embodiments of a camera having an optics holder component with a flange and/or a base component with a ledge feature for robust mounting for a folded optics assembly, according to some embodiments, e.g., as described herein with reference to FIGS. 1-7, according to some embodiments. In addition, computer system 800 may implement methods for controlling operations of the camera and/or for performing image processing images captured with the camera. In some embodiments, the device 700 (described herein with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 102 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 802 may include additional types of processors, such as graphics processing units (GPUs), application specific integrated circuits (ASICs), etc. In multiprocessor systems, each of processors 802 may commonly, but not necessarily, implement the same ISA. In some embodiments, computer system 800 may be implemented as a system on a chip (SoC). For example, in some embodiments, processors 802, memory 804, I/O interface 806 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 804 may be configured to store program instructions 820 accessible by processor 802. In various embodiments, system memory 804 may be implemented using any suitable memory technology, such as static random-access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent, or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing, or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a base module, comprising:
      an upper horizontal ledge;
      a recess comprising one or more vertical interior walls extending down from the upper horizontal ledge; and
      an image sensor located at a bottom area of the recess;
   an optical components holder, comprising:
      one or more vertical perimeter walls extending into the recess and facing the one or more vertical interior walls of the recess;
      a horizontal flange extending outward from the one or more vertical perimeter walls and at least partially over the upper horizontal ledge of the base module;
      wherein the optical components holder is configured to hold a group of optical components, including:
         one or more lenses; and
         a light folding element configured to fold light that passes through the one or more lenses to the image sensor; and
   an adhesive adhering the optical components holder to the base module, wherein the adhesive extends:
      between the one or more vertical perimeter walls of the optical components holder and the one or more vertical interior walls of the recess; and
      between the horizontal flange of the optical components holder and the upper horizontal ledge of the base module.

2. The camera of claim 1, wherein the horizontal flange is configured to redirect a flow of the adhesive horizontally, during assembly of the optical component holder into the recess of the base module, so that the adhesive does not protrude above the horizontal flange.

3. The camera of claim 1, wherein:
   the one or more vertical interior walls of the base module provide a continuous vertical boundary for the recess; and
   the adhesive extends continuously between the vertical surfaces around the boundary.

4. The camera of claim 1, wherein the upper horizontal ledge of the base module and the one or more vertical interior walls of the base module provide a continuous surface at an upper perimeter of the recess.

5. The camera of claim 1, wherein an opening between the horizontal flange of the optical components holder and the upper horizontal ledge of the base module is configured to allow ultraviolet light to reach the adhesive extending between the horizontal flange of the optical components holder and the upper horizontal ledge of the base module.

6. The camera of claim 1, wherein the adhesive forms a continuous bond line along a complete perimeter between the optical components holder and the base module.

7. The camera of claim 1, wherein adhesive between the horizontal flange of the optical components holder and the upper horizontal ledge of the base module is configured to provide a compressive resistance to vertical forces.

8. The camera of claim 1, wherein the base module comprises a lower horizontal ledge that extends inward, from the one or more vertical interior walls of the recess, at least to a lower end portion of the one or more vertical perimeter walls of the optical components holder.

9. The camera of claim 8, wherein the adhesive extends between the lower horizontal ledge that extends inward from the one or more vertical interior walls of the recess and one or more surfaces of the optical components holder at the lower end portion of the one or more vertical perimeter walls.

10. The camera of claim 8, wherein the lower horizontal ledge that extends inward from the one or more vertical interior walls is configured to redirect a flow of the adhesive horizontally, during assembly of the optical component holder into the recess of the base module, so that the adhesive does not protrude below the lower horizontal ledge.

11. A device, comprising:
a camera, including:
  a base module, comprising:
    an upper horizontal ledge;
    a recess comprising one or more vertical interior walls extending down from the upper horizontal ledge; and
    an image sensor located at a bottom area of the recess;
  an optical components holder, comprising:
    one or more vertical perimeter walls extending into the recess and facing the one or more vertical interior walls of the recess;
    a horizontal flange extending outward from the one or more vertical perimeter walls and at least partially over the upper horizontal ledge of the base module;
    wherein the optical components holder is configured to hold a group of optical components, including:
      one or more lenses; and
      a light folding element configured to fold light that passes through the one or more lenses to the image sensor; and
  an adhesive adhering the optical components holder to the base module, wherein the adhesive extends:
    between the one or more vertical perimeter walls of the optical components holder and the one or more vertical interior walls of the recess; and
    between the horizontal flange of the optical components holder and the upper horizontal ledge of the base module;
a processor configured to process image signals generated from the image sensor to produce an image; and
a display configured to display the image produced by the processor.

12. The device of claim 11, wherein the horizontal flange is configured to redirect a flow of the adhesive horizontally, during assembly of the optical component holder into the recess of the base module, so that the adhesive does not protrude above the horizontal flange.

13. The device of claim 11, wherein:
the one or more vertical interior walls of the base module provide a continuous vertical boundary for the recess; and
the adhesive extends continuously between the vertical surfaces around the boundary.

14. The device of claim 11, wherein the upper horizontal ledge of the base module and the one or more vertical interior walls of the base module provide a continuous surface at an upper perimeter of the recess.

15. The device of claim 11, wherein an opening between the horizontal flange of the optical components holder and the upper horizontal ledge of the base module is configured to allow ultraviolet light to reach the adhesive extending between the horizontal flange of the optical components holder and the upper horizontal ledge of the base module.

16. The device of claim 11, wherein the adhesive forms a continuous bond line along a complete perimeter between the optical components holder and the base module.

17. The device of claim 11, wherein adhesive between the horizontal flange of the optical components holder and the upper horizontal ledge of the base module is configured to provide a compressive resistance to vertical forces.

18. The device of claim 11, wherein the base module comprises a lower horizontal ledge that extends inward, from the one or more vertical interior walls of the recess, at least to a lower end portion of the one or more vertical perimeter walls of the optical components holder.

19. The device of claim 18, wherein the lower horizontal ledge that extends inward from the one or more vertical interior walls is configured to redirect a flow of the adhesive horizontally, during assembly of the optical component holder into the recess of the base module, so that the adhesive does not protrude below the lower horizontal ledge.

20. A method, comprising:
dispensing adhesive proximate an upper horizontal ledge of one or more walls of a base component configured to house a sensor for a camera module comprising the base component and an optical components holder, where said dispensing adhesive comprises dispensing adhesive to partially overhang the upper horizontal ledge onto which the adhesive is dispensed;
moving one or more of the base component and the optical components holder toward the other of the base component and the optical components holder to create the camera module, wherein said moving causes at least some of the adhesive to spread between opposing surfaces of respective vertical walls of the base component and the optical components holder of the camera, wherein a flow of at least some of the adhesive during said moving is redirected horizontally between a horizontal flange extending outward from one or more of the vertical walls of the optical components holder and the upper horizontal ledge of the base, and wherein said moving comprises performing an active alignment of one or more components of the optical components holder with regard to the sensor; and
curing, via ultraviolet light, at least a portion of exposed adhesive formed between a flange of the optical components holder and the upper horizontal ledge of the wall of the base component during said moving;
moving the camera module to a location for a thermal curing process; and
curing, via the thermal curing process, the adhesive.

* * * * *